Sept. 11, 1962  W. E. BAKER  3,053,004
FISHING ROD ATTACHMENT WITH MECHANICAL FINGER
Filed Nov. 15, 1960
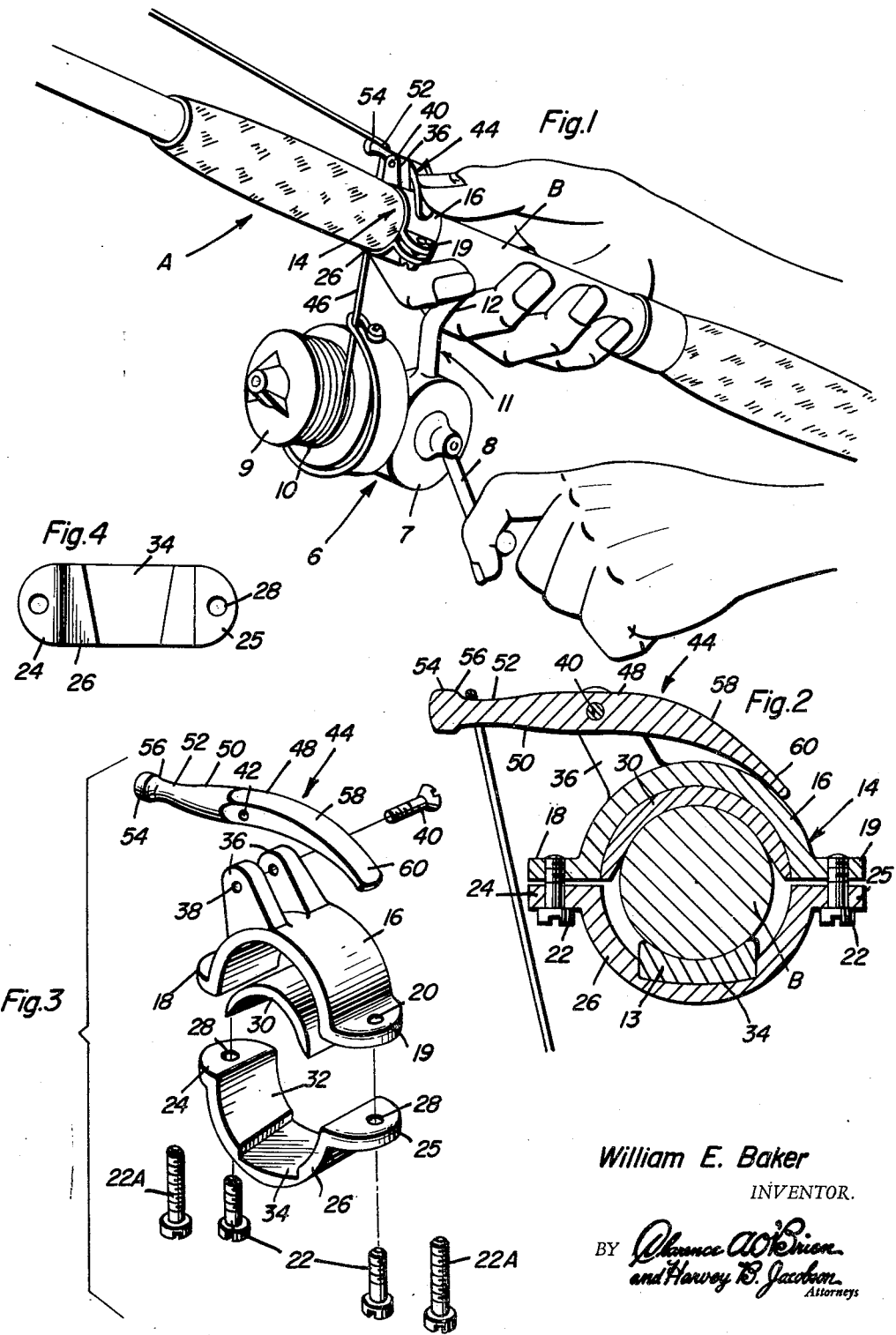
William E. Baker
INVENTOR.

3,053,004
FISHING ROD ATTACHMENT WITH MECHANICAL FINGER
William E. Baker, 402 Hemlock St., Elizabeth City, N.C.
Filed Nov. 15, 1960, Ser. No. 69,478
3 Claims. (Cl. 43—25)

This invention relates to a novel attachment for a fishing rod provided with a manually controllable line holding, guiding and releasing finger and clamp therefor which is such in construction that it serves to position and suspend a spinning reel assembly in an advantageous manner for cooperation with the finger.

A general object of the invention is to provide a finger-equipped rod clamp which is simple, practical, efficient in use and which embodies features and advantages not offered in similarly constructed and performing prior art rod attachments.

Briefly, the present invention comprises a mechanical line holding finger having a reduced neck and complemental enlarged head at the outer end of the neck, the other end of said finger having a manually controllable and trippable finger-piece, means for pivotally mounting said mechanical finger on a fishing rod adjacent to a spinning reel carried by said means.

Considered from a combination standpoint the invention is characterized by a fishing rod, a clamp embracing and mounted on a predetermined portion of said rod, said clamp embodying a lower portion having a keeper notch therein, a spinning reel assembly having a hanger bracket with a lateral upper end fitted and held in said keeper notch, a pair of lugs fixed on and rising above an upper part of said clamp, and a mechanical line guiding, holding and releasing finger disposed at right angles to the rod and pivotally mounted between said lugs.

More specifically, the invention has to do with a two-part rod clamp embodying an upper semi-circular section provided adjacent one end with a pair of spaced parallel upstanding lugs and provided at opposite ends with ears having bolt holes, a lower semi-circular section having similar ears with bolt holes at its ends, an interior surface portion of said lower section having an open-ended keeper notch, bolts passing through their intended bolt holes for securing the over-all clamp on a fishing rod, and a mechanical line handling finger having an intermediate portion pivotally and removably mounted between said lugs, one end portion projecting to the right of the lugs and the other end portion to the left thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a fragmentary portion of a fishing rod or pole, a substantially conventional type spinning reel assembly, and the improved finger-equipped adapter means or clamp and how it is mounted and how the mechanical finger is used.

FIG. 2 is an enlarged sectional view through the clamp and finger revealing the structural characteristics thereof.

FIG. 3 is an exploded perspective view showing all of the component parts of the over-all attachment.

FIG. 4 is a plan view of the lower half-section or part of the two-part clamp.

In FIG. 1 the fishing rod is denoted at A and the part on which the invention is mounted is designated at B.

The aforementioned spinning reel assembly is denoted generally at 6, the encased reel being denoted at 7, the crank 8, the spool 9, the fishing line 10 and the anchor or suspension bracket at 11. It will be noted that the bracket comprises a vertical hanger member 12 the upper end of which is provided with a lateral bent portion commonly referred to as an attaching and retaining key 13 as brought out in FIG. 2.

The attachment comprises adapter means, more specifically, a readily applicable and removable two-part or sectional clamp 14 (FIG. 2). The upper semi-circular half section or part is denoted at 16 and is provided at its ends with outstanding ears 18 and 19 provided with screw-threaded holes 20 for assembling and retaining bolts 22. These ears 18 and 19 are opposed to and parallel with similar ears 24 and 25 at the end portions of the lower semi-circular part 26. The bolts 22 pass through the unthreaded holes 28 and are screwed into the holes 18 and 19 in the manner shown in FIG. 2 thus binding the clamp on the rod portion B. There may be times when the cross-section of the rod is such that the clamp does not fit tightly. In this case one or more arcuate shims 30 may be brought into play and employed in the manner shown. The inner peripheral surface 32 of the half-section or part 26 is provided with an open-ended tapered groove which provides a keeper seat or notch at 34. This seat provides a wedge-like keyway and removably seats the aforementioned key or keeper 13 (FIG. 2).

The upper left hand portion of the clamp section 16 is provided with a pair of spaced parallel upstanding lugs 36. These lugs are provided with pivot pin holes 38 to accommodate a pivot pin or bolt 40 which passes through the hole 42 in the improved mechanical finger 44. It will be observed that the pivot point in this construction is to the left of the center of the half-section 16 and is properly related to that part 46 of the fishing line which spins off the spool 9. Also, this carefully worked out arrangement makes it possible to satisfactorily hang or suspend the reel assembly 6 below the rod and to locate the mechanical finger substantially diametrically opposite in a plane above the rod. Control of the fishing line by reason of this carefully planned relationship of parts is convenient and reliable.

The rigid elongated mechanical finger 44 comprises a central or body portion 48 and a tapering finger 50. This finger is circular in cross-section and is reduced in cross-section as at 52 to provide a smooth-surfaced neck. The outer end of the neck terminates in an enlarged head 54 providing a line-retaining shoulder where the neck merges with and joins the head as at 56. The head 54 is also circular in cross-section. One might compare this neck and head design to a poll on a carpenter's hammer. The left hand half-portion (FIG. 1) of the finger 44 is longitudinally bowed as shown in FIG. 2 and is gradually reduced in cross-section from the median to the right hand end portion. In fact, this part of the finger is rectangular in cross-section and the top surface 58 is smooth and these features together provide a readily trippable finger-piece 60. The finger-piece is operable toward and from the clamp section 16 as best shown in FIG. 2.

With reference again to FIG. 3 it may be pointed out that the bolts 22A are alternate fasteners or bolts. In some instances, the short ones 22 will serve and in other instances the longer bolts 22A are required for securing the half-sections of the clamp 14 together. A package containing the ready-to-use attachment will include one or more shims 30, and at least two sets of bolts 22 and 22A.

It will be obvious that the adapter means or clamp 14 is novel by reason of the particular shape, form and cooperation of the companion half-sections 16 and 26. The half-section 26 with its keeper seat 34 provides a keyway for the key 13 permitting the entire spinning reel assembly to be satisfactorily supported and allowing the hanger bracket 12 to provide a seat for the index finger as illustrated in FIG. 1. The off-side pivotal mounting of the finger 44 with the headed end portion (at the right in FIG. 1) extending out beyond the marginal limits of the clamp means 14 is of significance in that the line 46 can be trained over the finger when the finger is held in its up line guiding position as illustrated in FIG. 1 and then readily freed from the headed terminal as soon as the fingerpiece 58 is intentionally released. The finger-piece itself occupies a natural easy-to-use position to be actuated and can be readily controlled by the fisherman's thumb. Consequently, with this construction and arrangement both hands are readily usable and instead of the angler using his index finger to control the line portion 46, the mechanical finger is used in lieu thereof. It follows that this improved mechanical finger provides an adequate substitute for the fisherman's index finger and will doubtless meet with the approval of anglers, manufacturers, retailers and others.

The clamp 14 serves to accommodate both left-hand and right-hand spinning reels. To this end, the top or upper half-section 16 may be turned 180° from the position shown (FIGS. 1 and 2) and then used with a right hand spinning reel (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mechanical finger attachment for a fishing rod having a spinning reel attached thereto, said attachment comprising a sectional rod embracing clamp embodying an upper section adapted to extend transversely across and embrace the upper half portion of said rod and having opposite lengthwise edges thereof provided with a pair of opposed spaced parallel upstanding lugs, said lugs being located between the transverse center and one end of the section, a companion lower section adapted to extend beneath and embrace the lower half-portion of the rod, corresponding ends of said sections having means separably connecting the sections with each other, and an elongated mechanical line-lifting and guiding finger extending lengthwise above and in alignment lengthwise with said upper section and having an intermediate portion thereof pivotally supported between said lugs one end portion of said finger projecting beyond said lugs and terminating in a line-accommodating reduced neck and terminal head, the other end portion of the finger projecting beyond the lugs and overlying an adjacent surface of the aforementioned upper clamp section, constituting a finger-piece and having limited movement when pressed against the cooperating surface of said upper section.

2. An attachment for a fishing rod comprising a two-part rod clamp embodying an upper semi-circular section having an upwardly disposed convex surface provided at opposite ends with outstanding ears and provided adjacent one end with a pair of spaced parallel oblique-angled lugs, said lugs projecting beyond the convex surface and having outwardly disposed surfaces substantially flush with the respective lengthwise edges of said upper section, a companion lower semi-circular section having ears at opposite ends thereof opposed to and separably connected with the first-named ears, an interior surface of said lower section having an open-ended keeper notch, a manually actuatable mechanical line-handling finger having an intermediate portion pivotally mounted between said lugs, said finger being elongated, the longitudinal axis of said finger substantially corresponding with the lengthwise dimension of the convex surface of the upper section and having one end portion overhanging the end portions of the upper sections adjacent said lugs and projecting therebeyond, said finger being rigid and provided at said end portion with a reduced neck treminating in an enlarged head, the other end portion of said finger being fashioned into a fingerpiece, said fingerpiece terminating inwardly of the adjacent ear on said upper section and being curved lengthwise, the curvature conforming to the curvature of the cooperating convex surface toward and from which it is movable and said fingerpiece having a surface adapted to be pressed firmly against said convex surface by the action of the user's finger, and a spinning reel assembly embodying a hanger bracket having an arm with a laterally bent terminal defining a retaining lug and said retaining lug adapted to be removably fitted in the aforementioned keeper notch.

3. For use on a fishing rod having a clamp embracing a handle portion of the rod and suspending a spinning reel below said handle portion; line tensioning, guiding and releasing means comprising a pair of opposed spaced parallel lugs fixed on and rising vertically from an upper available surface of said clamp, said lugs being offset and thus positioned to one side of the longitudinal axis of said rod, an elongated rigid finger of a length greater than the cross-section of said handle portion having a median portion thereof pivotally mounted and cradled between upper end portions of said lugs and free for operation in a plane spaced above the upper surface of said clamp, the axis of the pivot point of said finger being parallel with the lengthwise axis of said rod and the lengthwise axis of said finger being at right angles to the lengthwise axis of said rod, a substantial part of one end portion of said finger projecting to the right beyond said lugs and having a reduced smooth-surfaced neck circular in cross-section and merging into a terminal head also circular in cross-section, said head and neck being adapted to overhang and project well beyond the peripheral surface of the aforementioned clamp, the other end portion of said finger projecting to the left of said lugs, being swingable toward and from said clamp, being rectangular in cross-section, curved longitudinally and constituting a finger-piece capable of being readily actuated and controlled by the thumb of the user's hand while at the same time grasping and holding said handle portion.

References Cited in the file of this patent

UNITED STATES PATENTS

| 1,902,749 | Baird et al. | Mar. 21, 1933 |
| 1,964,631 | Hansen | June 26, 1934 |
| 2,515,896 | Rakoczy | July 18, 1950 |
| 2,615,664 | Reeves | Oct. 28, 1952 |
| 2,632,273 | Fletcher | Mar. 24, 1953 |
| 2,648,505 | Mauborgne | Aug. 11, 1953 |
| 2,731,756 | Nelson | Jan. 24, 1956 |
| 2,804,711 | Kozar | Sept. 3, 1957 |
| 2,810,982 | Bucciarelli | Oct. 29, 1957 |
| 2,843,963 | Butehorn | July 22, 1958 |

FOREIGN PATENTS

| 1,116,675 | France | Feb. 6, 1956 |
| 1,176,849 | France | Nov. 24, 1958 |